United States Patent [19]

Gruich

[11] Patent Number: 4,749,149
[45] Date of Patent: Jun. 7, 1988

[54] ORNITHOPTER-TYPE VEHICLE, AND METHODS OF CONSTRUCTING AND UTILIZING SAME

[76] Inventor: Peter Gruich, 31432 Schoenherr, Apt. 5, Warren, Mich. 48093

[21] Appl. No.: 377,409

[22] Filed: May 12, 1982

[51] Int. Cl.⁴ ............................................. B64C 33/02
[52] U.S. Cl. ............................................. 244/22; 244/72; 244/903; 244/11
[58] Field of Search ............... 244/13, 16, 22, 11, 244/72, DIG. 1, 28, 36, 143

[56] References Cited

U.S. PATENT DOCUMENTS

| | | | |
|---|---|---|---|
| 877,529 | 1/1908 | Tkatzschenko | 244/28 |
| 980,840 | 1/1911 | Rozboril et al. | 244/72 |
| 1,247,960 | 11/1917 | Jelalian | 244/28 |
| 1,989,755 | 2/1935 | Jelalian | 244/22 |
| 2,783,955 | 3/1957 | Fitzpatrick | 244/72 |
| 2,960,285 | 11/1960 | Lopez | 244/36 |
| 4,220,299 | 9/1980 | Motter | 244/143 |

FOREIGN PATENT DOCUMENTS

| | | | |
|---|---|---|---|
| 63774 | 8/1892 | Fed. Rep. of Germany | 244/22 |
| 262226 | 12/1910 | Fed. Rep. of Germany | 244/22 |
| 18287 | 12/1900 | United Kingdom | 244/72 |

*Primary Examiner*—Galen Barefoot
*Attorney, Agent, or Firm*—Irving M. Weiner; Joseph P. Carrier; Pamela S. Burt

[57] ABSTRACT

An ornithopter which is propelled upwardly and forwardly by means of flapping wings, similar to the flight of a bird or bat. The power is supplied by a small engine that is mechanically-connected to a hydraulic pump which drives a single hydraulic cylinder and utilizes only the retraction stroke to power both wings simultaneously downwardly. The wings are brought back to the normal position by an elastic device, which in addition will not permit the wings to go beyond optimum positions. A double-acting hydralic cylinder is also provided to move the horizontal tail in an up and down motion. The operation of the wings can be automatic or manually-operated by the pilot. The rear legs and front support are constructed in such a manner that allows the ornithopter to rise and land vertically which permits takeoff and landing from most any type of terrain. The ornithopter can be assembled and disassembled quickly.

8 Claims, 13 Drawing Sheets

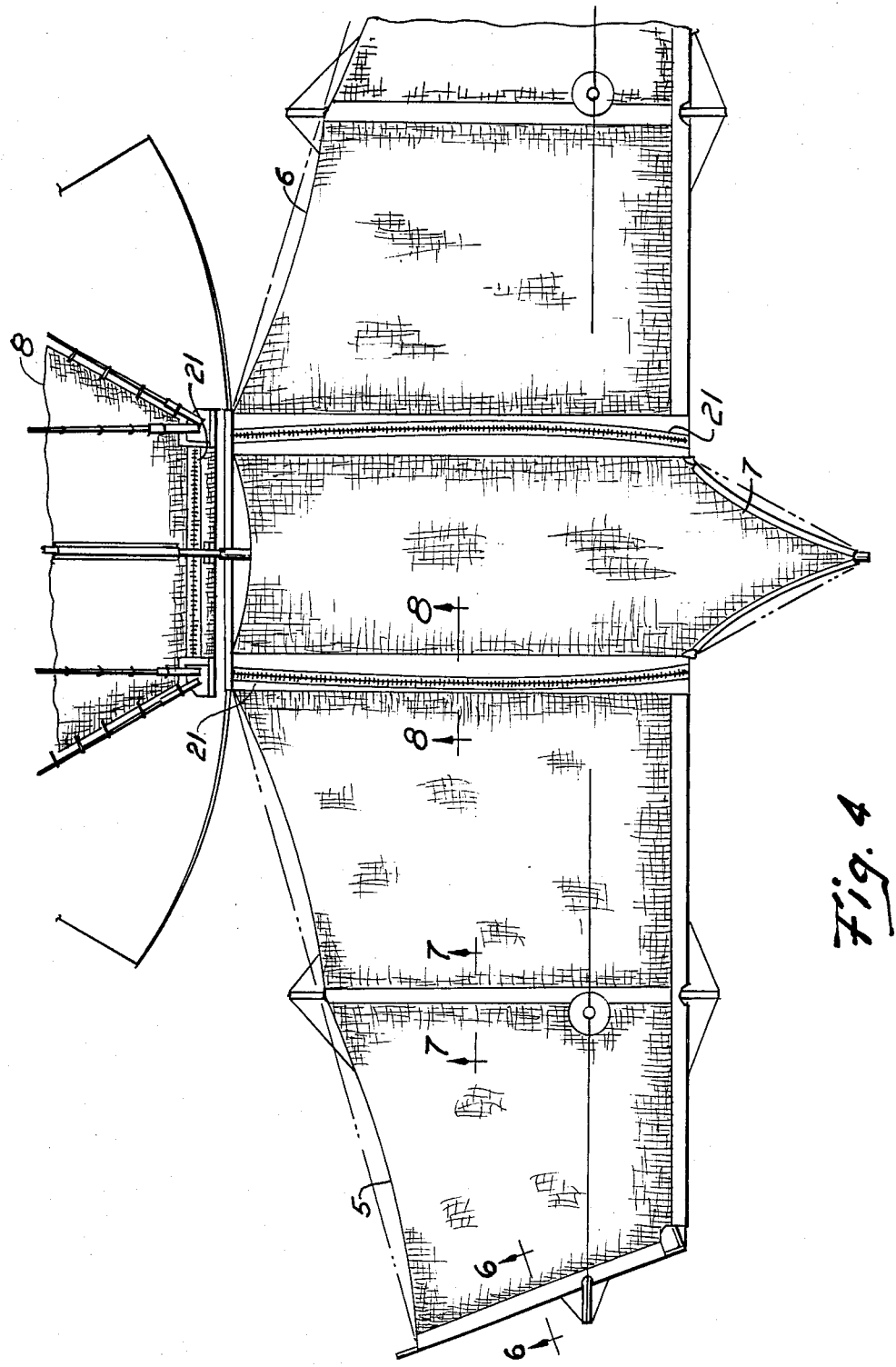

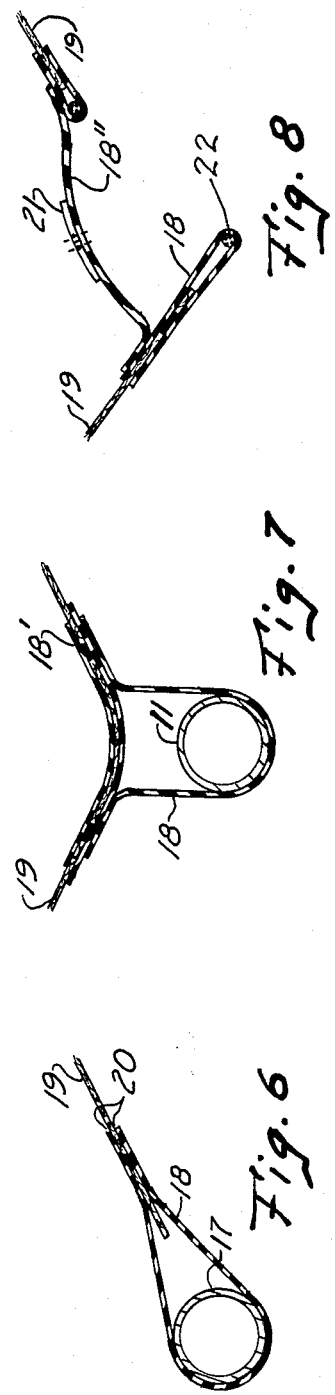
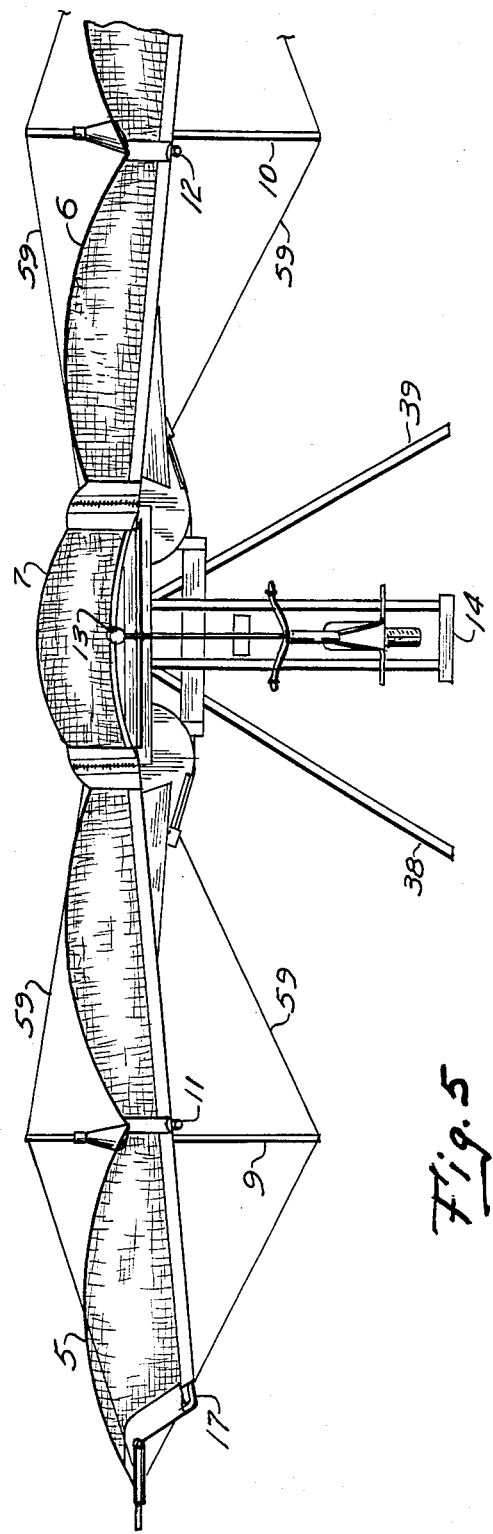

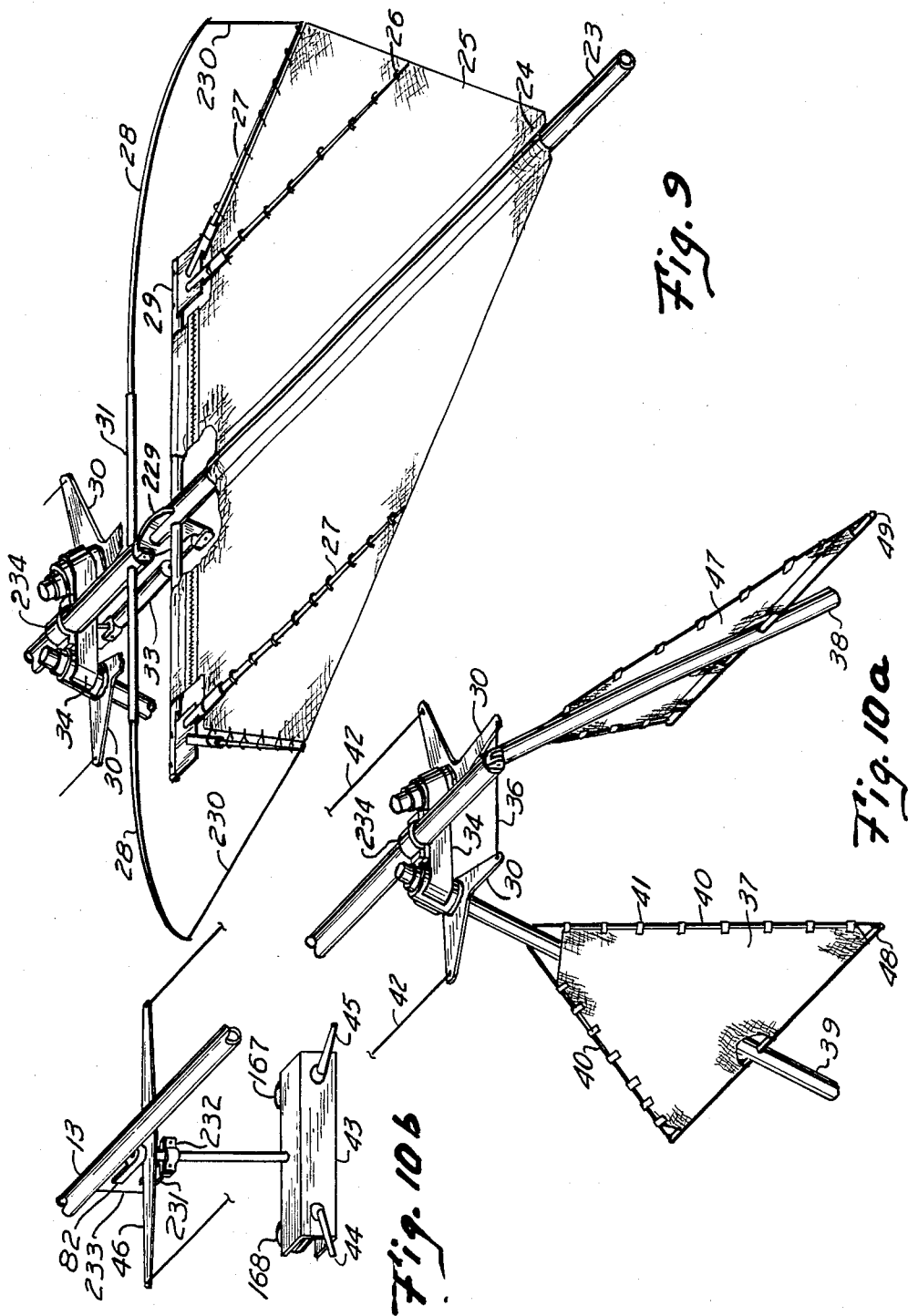

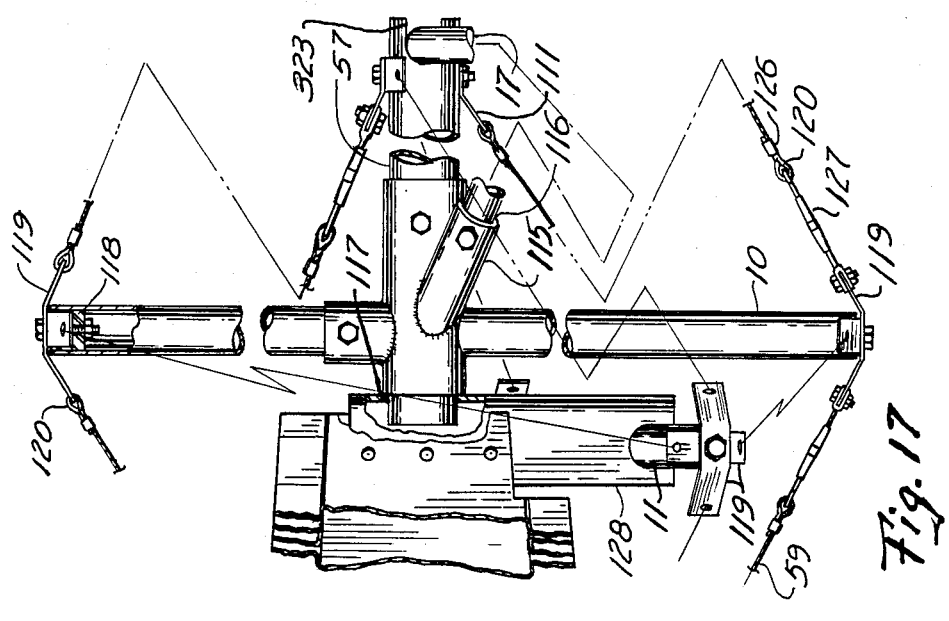
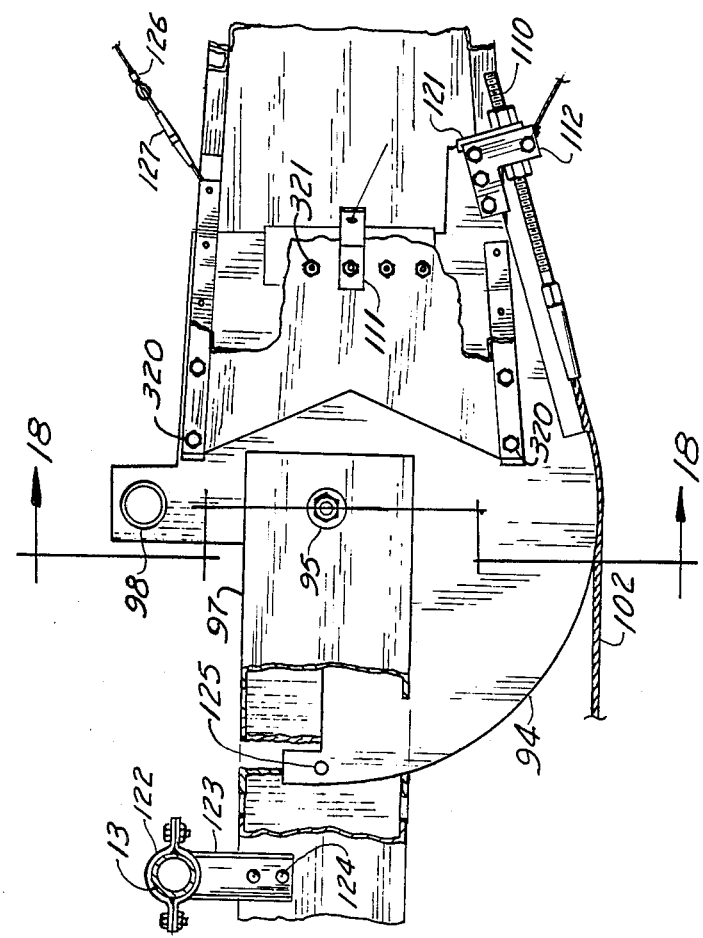
Fig. 17
Fig. 16

ORNITHOPTER-TYPE VEHICLE, AND METHODS OF CONSTRUCTING AND UTILIZING SAME

BACKGROUND OF THE INVENTION

1. Field of the Invention

The present invention relates to air vehicles, and more particularly to ornithopters which are those air vehicles that utilize flapping wings to sustain flight. There are basically two main categories of ornithopters; those that have mechanical power sources, and those that wholly sustain flight by human effort alone. The present invention is of the former type employing a small engine, pump, hydraulic circuitry, hydraulic cylinders, and electronics.

2. Description of the Relevant Art

Ornithopter air vehicles have been proposed since the earliest of times. They have been described in Greek fables and histories of air flight. However, unresolved problems have hindered practical development. Those without a power source that depend wholly on human physical effort to sustain flight have not been designed to give the flyer respite to go any distance or achieve any height. Dropping of such a vehicle from another aircraft assures a longer stay in the air, but in that case the aircraft becomes more a glider than an ornithopter. A difficult problem is designing the wing movement in such a manner that the flyer encounters no shock moves, while assuring the flyer complete control of the wing operation.

Previous attempted powered ornithopters have problems with weight and control, as well as with takeoffs and landings. The present invention has solved these problems.

The relevant art is discussed hereinbelow.

U.S. Pat. No. 3,498,574, issued to Ernst in 1970, relates to a fluttering wing aerial propelled apparatus suitable for carrying a man. The Ernst vehicle is operated by the pilot by manipulating a handle which opens and closes parts of a cylinder-piston unit, causing the wing to move in the direction desired by the pilot. The wing exactly follows or copies the movements of the pilot. The wing working force is supplied by fluid under pressure while the pilot works the control. Two cylinder-piston units are employed, one for each wing. The tail is moved physically by the pilot's feet.

The present invention, on the other hand, employs only one cylinder-piston for both wings, and utilizes only the retraction stroke to pull the wings downwardly. The wings are raised by a spring-like device. Also, the tail is operated by a separate double-acting fluid cylinder, which moves the tail up and down, as controlled by the pilot.

U.S. Pat. No. 544,816, issued to Lilienthal in 1895, discloses one of the earliest attempts to design an ornithopter. The vehicle was raised into the air by the flyer running into the wind, and after the vehicle was airborne it was balanced and steered by the flyer by means of a suitable movement of his body so as to displace the center of gravity.

U.S. Pat. No. 2,218,599, issued to Brunner in 1940, discloses a propulsion means for ornithopters.

U.S. Pat. No. 2,407,777, issued to Grawunder in 1946, relates to a glider having two pairs of wings which are actuated by the pilot to control the elevation of the glider as it moves through the air.

U.S. Pat. No. 2,578,845, issued to Schmidt in 1951, discloses an aircraft propelled by beating wings, having two distinct motions comprising the "beat" made by a power-driven reciprocator, and the "swing" motion made by the resistance of the air against the eccentrically-held wing blade. The "swing" motion is at right angles to the "beat" motion. The present invention differs from the Schmidt invention in many aspects. However, one main difference is in the employment of fluid cylinders. The present invention utilizes the retraction stroke of only one cylinder, while the Schmidt invention utilizes a plurality of cylinders.

U.S. Pat. No. 2,783,955, issued to FitzPatrick in 1957, relates to a craft which is suitable for travel in the air, on land, and on and under the water. It is a very complex vehicle designed to perform many functions. In contrast, the present invention is designed only to fly like a bird and is designed as simply as possible to perform this function using only the retraction stroke of only a single piston to achieve the desired movement of the wings.

U.S. Pat. No. 2,859,553, issued to Spencer in 1958, discloses a toy aircraft of the ornithopter or flapping wing type powered by a rubber band which is wound up by crank. When the crank is released, it causes the wing spars to move up and down.

U.S. Pat. No. 3,446,458, issued to Rogallo in 1969, relates to control devices for altering the membrane configuration of a flexible wing aircraft.

U.S. Pat. No. 3,817,478, issued to McDonald in 1974, relates to vehicles for gliding flight, and in particular to an air vehicle adapted for aerial flight to include a pair of hand-operated wings and a foot-operated tail.

The main feature, among others, which sets the present invention apart from any of the above patents or any known ornithopters is the design which actuates both wings simultaneously with only one hydraulic cylinder, and only with the employment of the retraction stroke of that single cylinder.

SUMMARY OF THE INVENTION

The present invention discloses an ornithopter whose purpose is not to replace existing forms of aircraft, but rather to provide an exciting sporting means at relatively low cost, easy transportability, and to be as safe as possible.

The vehicle consists of the main features of all aircraft having a pair of wings, a fuselage, a horizontal tail and an inverted "V" type rudder. It is powered by a small engine, and for purposes of illustration only a motorcycle engine has been employed.

The wings are of special design utilizing features of bird and bat wings which take advantage of aerodynamics principles that provide for more efficient flight. The covering of the vehicle called the sail consists of four parts: the right wing sail, the left wing sail, the center fuselage, and the tail surface sail. The fuselage and wing sails are joined together by zippers for ease of assembly and disassembly. The zippers are located in low stress areas, and do not carry any appreciable load. The sail material, described more fully hereinbelow, is of an excellent aerodynamic quality. The method of attachment and bonding, also described more fully hereinbelow, assures excellent holding qualities and safety.

The engine is connected to a hydraulic pump which drives via hydraulic circuitry a single hydraulic cylinder that utilizes the retraction stroke only to power both wings downwardly. This produces a lift and thrust on the wings similar to that which would be produced by a bird. The wings are brought back to their normal up position by elastic springs which explains one reason why only the retraction stroke is needed to operate the wings. The hydraulic cylinder rod is connected to a forked cable, which through cam-type pulleys retracts both wings downwardly simultaneously. Along with the elastic springs, there are also nylon ropes. These ropes also have some flexibility; however, they function primarily as bump stops to prevent the wings from traveling beyond the intended design limit.

The vehicle has two rear legs or supports which also function as rudders and a shock absorbing front support. The length of these supports is such as to permit the wings to be stroked through their full power stroke. This enables the vehicle to become airborne without any forward rolling motion. Similarly, landing is achieved by gliding into the wind, flaring up to present the maximum sail area to the wind, then reducing altitude until the rear legs contact the ground. The wings are then stroked downwardly to further decelerate the motion of the vehicle, allowing it to settle down on the shock absorbing front support. The rear legs also have attached to them sails which provide the steering surfaces.

The pilot is provided with two sets of controls: the regular motorcycle controls which are located on the motorcycle handlebars and used for controlling the engine speed and hydraulic pump output, and the flight controls which are located on the flight control panel.

The flight control panel, which also serves as the steering or rudder control, houses the electrical components such as the ignition key, switches, and relays as well as the two hand controlled 4-way hydraulic valves required for manually controlling the horizontal tail and manually controlling the position and stroking of the wings.

A primary object of the present invention is to provide a propulsion means having flapping wings which may be operated to closely simulate the operation of the wings of birds.

Another primary object of the present invention is to provide a means of powering both wings simultaneously by the retraction stroke of one hydraulic cylinder.

A still further object of the present invention is to provide a novel type of construction and mechanism to retract the wings.

Yet another object of present invention is to provide pilot control of the operation of the wings and tail as well as automatic control of the wings.

Yet another object of the present invention is to provide a novel type of construction whereby the steering of the vehicle is under the control of the pilot.

Yet another object of the present invention is to provide rear legs and a front support which will permit vertical takeoffs and landings from or onto any type of terrain, and a mechanism to absorb the shock of landing.

Yet another object of the present invention is to provide a novel type of wing construction hereinafter more specifically explained.

Yet another object of the present invention is to provide means of quick disassembly and assembly for easy transportability.

Yet another object of the present invention is to provide rugged and simple construction which will result in low maintenance and repair.

Other objects of this invention will in part be obvious and in part hereinafter pointed out.

BRIEF DESCRIPTION OF THE DRAWINGS

FIG. 4 is an enlarged partial plan view of FIG. 1 showing the four parts of the covering of the ornithopter which comprise the sail.

FIG. 5 is a front elevational view of FIG. 4 showing the sail in an aerodynamically-loaded condition.

FIG. 6 is a section showing the method of attachment of the sail to the wing tip tube.

FIG. 7 is a section showing the method of attachment of the sail to the mid portion of the wing.

FIG. 8 is a section showing the method of attachment of the zippers to the sail.

FIG. 9 is a perspective view of the horizontal tail, its construction, and the attachment to the main keel tube.

FIG. 10a is a perspective view of the rear legs along with steering stabilizing surfaces.

FIG. 10b is a perspective view of the flight control panel and the method of attachment to the main keel tube.

FIG. 16 is a front elevational view of the left inboard wing structure.

FIG. 17 is a front elevational view of the left outboard wing structure.

DETAILED DESCRIPTION OF PREFERRED EMBODIMENTS

Figure 1:
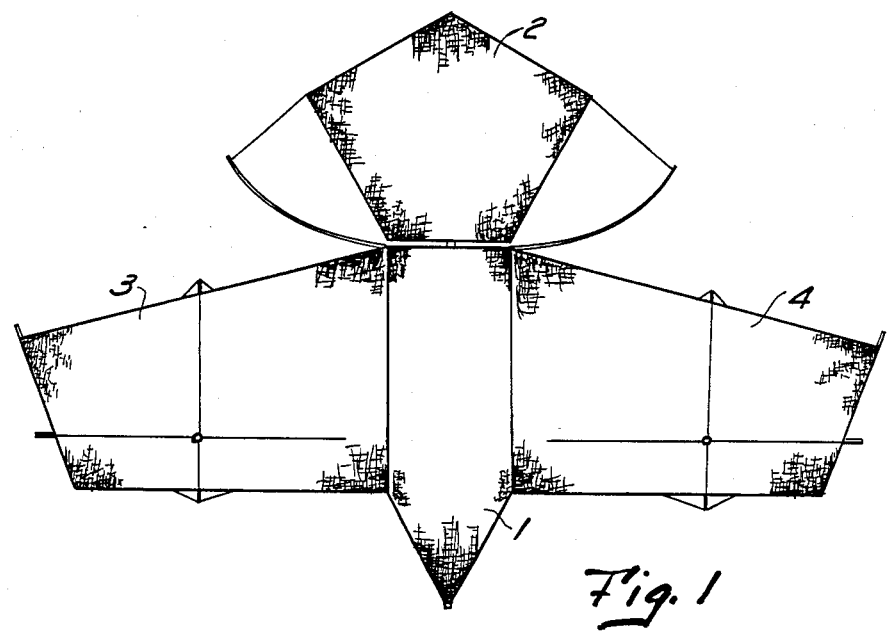
FIG. 1 is a plan view of the ornithopter constructed in accordance with a first possible embodiment of the invention.

Before explaining the invention in detail, it is to be understood that the present invention is not limited in its application to the details of construction and shape of the embodiments illustrated in the accompanying drawings because the invention is capable of other embodiments and of being practiced and carried out in various ways and with various materials. Furthermore, it is to be understood that the phraseology and terminology employed herein are for the purpose of description and illustration only, and not for the purpose of limitation.

Referring now to the drawings, it is to be understood that like reference numerals designate identical or corresponding parts throughout the several figures.

Figure 2:
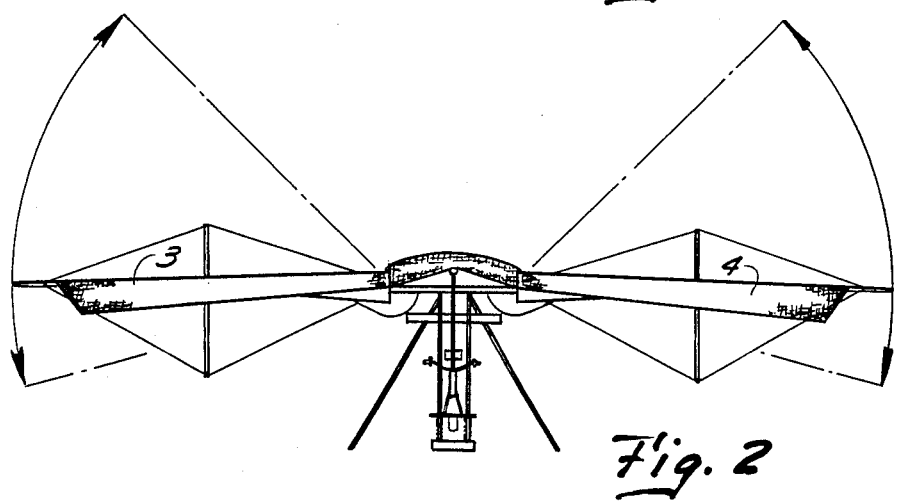
FIG. 2 is a front elevational view of the ornithopter of FIG. 1.
Figure 3:
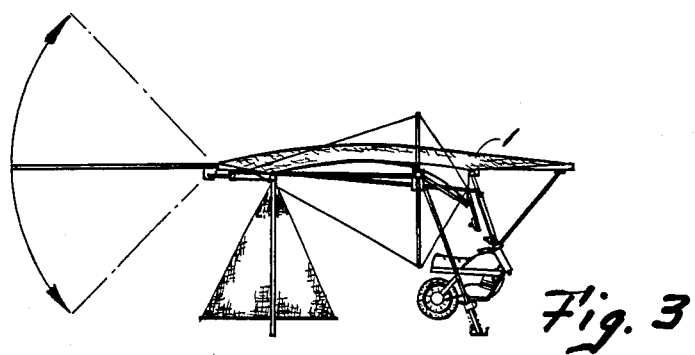
FIG. 3 is a side elevational view taken from the left side of FIG. 2.

The ornithopter specifically illustrated in FIGS. 1, 2 and 3 is comprised basically of the fuselage 1, the right wing 3, left wing 4, and the tail 2. FIG. 4 shows the covering of the vehicle called the sail, which is composed also of four parts: the right wing sail 5, the left wing sail 6, the fuselage sail 7, and the tail sail 8. The wing sails 5 and 6 are joined to the center fuselage sail 7 by means of zippers 21. The use of zippers 21 enable the vehicle to be disassembled for shipping and transportation purposes. The zippers 21 are placed in low stress areas and are not under any appreciable load capacity.

FIGS. 5, 6, 7 and 8 show the manner in which the sails are attached to the various structures. FIG. 5 shows the sails in an aerodynamically-loaded condition as they would appear in flight. FIG. 6 shows a section through the wing tip area with the right tip tube 17 holding the latex rubber member 18 which in turn is attached to the "Temperkote" material 19 by means of "LOCTITE" superglue 20. "Temperkote" is a sail material composed of dacron and mylar. The mylar acts as an air barrier, not allowing the air to penetrate, and serves as a good aerodynamic surface. By punching holes in the "Temperkote" material 19, the latex rubber member 18 is bonded to itself as well as to the "Temperkote" material 19 and gives a type of riveting effect that is stronger than merely bonding to the "Temperkote" material. The sail material is flexibly mounted to the wing structure thereby minimizing stress concentrations. The flexibility is provided by the latex rubber member 18, giving and taking, dependent upon the pressures exerted on the sail material.

FIG. 7 shows one possible preferred method of attachment of the sail to the wing keel tube 11 and the wing keel tube 12. The wing keel tubes 11 and 12 run parallel to the center line of the vehicle, that is to the main keel tube 13, and are located midway down the wings 3 and 4. The "Temperkote" sail material 19 is bonded to the latex rubber member 18, which in turn is trapped around the wing keel tube 11. Another latex rubber member 18' is bonded to the "Temperkote" material 19 above the connection for additional strength and to provide the means for riveting discussed hereinabove.

FIG. 8 shows the method of attachment of the sails to the structure through the zipper area. The "Temperkote" material 19 is glued to the latex rubber member 18 as described above. The latex rubber member 18 is wrapped around steel cables 22, which also form the wing leading edge support and which in turn are attached to the wing structure. The zipper 21 is glued to another latex rubber member 18". The zipper utilized is a "Delrin" which is a jacket type chain with double sliders.

FIG. 9 delineates the horizontal tail structure 2. The main structural members are the tail main tube 23 and crossmember 29 which are assembled to the main keel tube 13 by means of the tail plate 229. At both ends of crossmember 29, there are provided fiber glass rods 27 which form a V-tail structure on both sides of the tail. The sail surface is held onto these rods 27 by means of rubber straps 26. The main portion of the sail is held onto the tail main tube 23 by means of the rubber tube 24 which slips over tail main tube 23 and runs substantially its entire length.

At the front of the tail there is provided a flare rod crossmember 31 which is welded into the main keel tube 13. This crossmember 31 provides a means of holding the tail flare rods 28 in place, which in turn, by means of chords 230, supply the tension required to keep the flare in the tail surface. The horizontal tail is actuated by the double-acting hydraulic cylinder 33, pivotally mounted to the saddle 34, whose control is discussed hereinbelow.

FIGS. 10a and 10b illustrate a schematic presentation of the inverted "V" tail rudder, its control, and construction. The flight control panel 43 is supported by the flight control rod 79 axially mounted into bellcrank 46 which is pivotally mounted in support bracket 82 and support bracket 231 with cap 232. Support brackets 82 and 231 are bolted onto the main keel tube 13 support plate 233. The bellcrank 46 is connected to the rear tail bellcranks 30 by means of rudder control cables 42 whereas the rear tail bellcranks are connected to each other through the elastic spring control cable 36.

Steering is accomplished by rotating the flight control panel 43 about its support center line which in turn produces a rotation of the rear tail bellcranks 30 which house rear leg supports 38 and 39 to which the tail surfaces 37 and 47 are mounted by means of crossmembers 48 and 49 respectively, nylon cables 40, and rubber tabs 41. The greater portion of the rudder sail areas are located to the rear of the support leg center lines in order to provide static directional stability in flight.

Rear legs 38 and 39 with bellcranks 30 are pivotally mounted into saddle 34 which is mounted to the main keel tube 13 by means of saddle cap 234.

Figure 19:
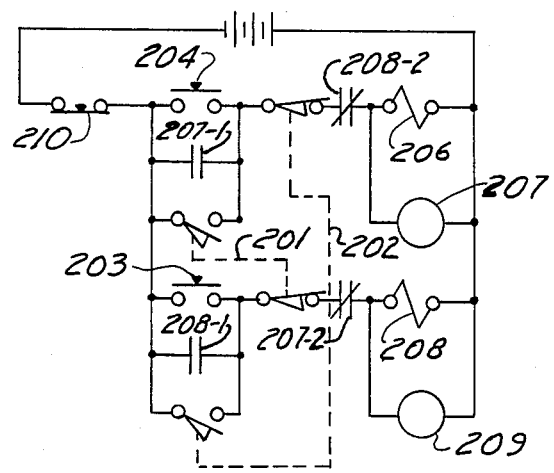
FIG. 19 is the electrical schematic for the operation of the ornithopter.

The flight control panel 43 houses, except for the limit switches, the electrical flight controls shown in FIG. 19 and the two hand actuated 4-way hydraulic valves 168 and 167 controlled by handles 44 and 45 respectively. The horizontal tail is controlled by handle 44 and manual control of the wings is accomplished with handle 45.

Figure 11:
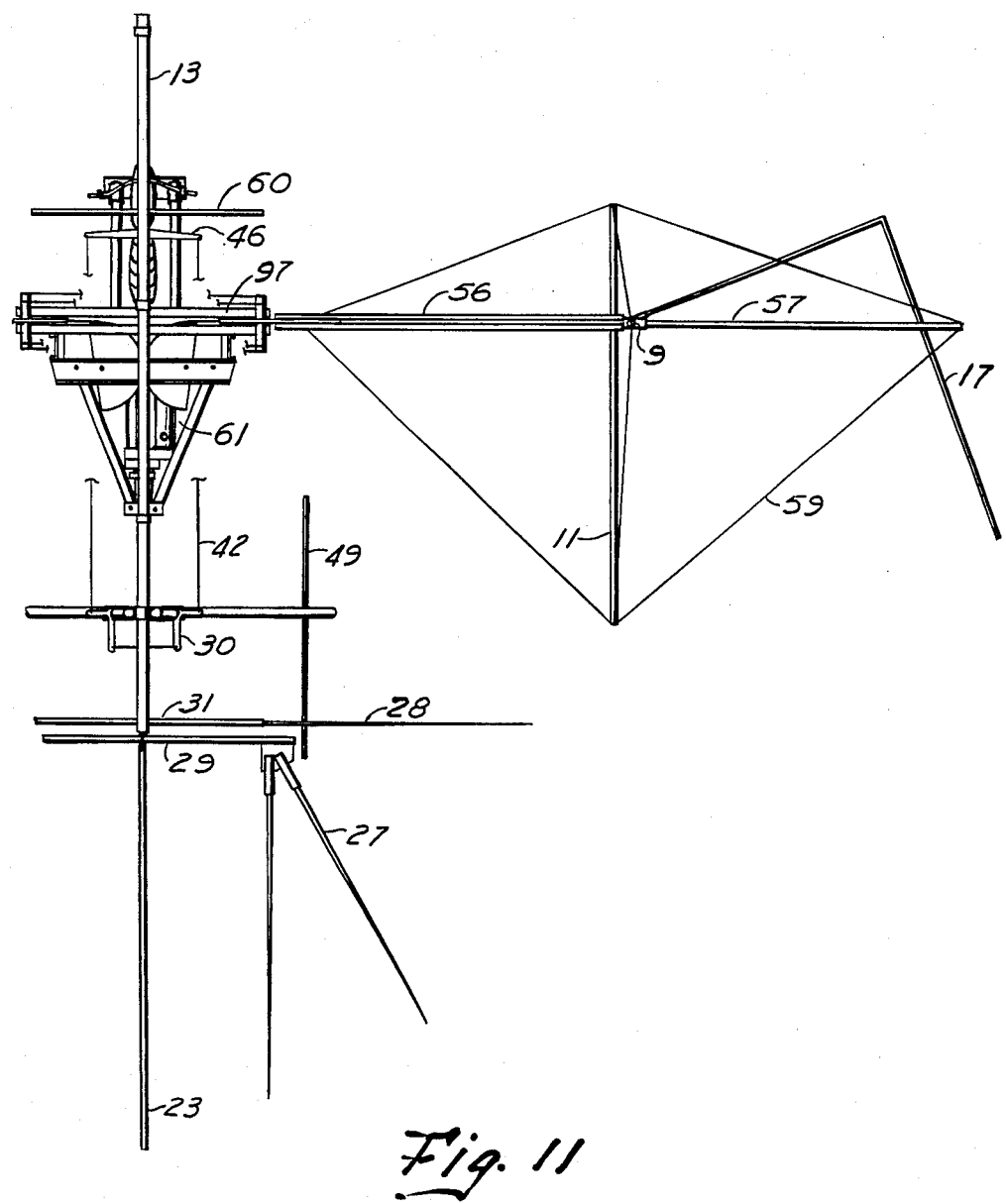
FIG. 11 is a partial plan view of the structure of the ornithopter without the sails.

FIG. 11 illustrates an unsailed presentation of a partial plan view of the vehicle. The sail has been removed to display more clearly the vehicle structure. At the top of the drawing is shown the front wing crossmember 60 attached to the main keel tube 13. This crossmember 60 supports the leading edge of the wing sails. Further down the drawing there is shown further details of the wing structure. The inboard wing spar 56 attaches to the wing support channels 97 which attaches to the main keel tube 13, and in turn the outboard wing tube 57 freely mounts into the inboard wing spar 56. The wing keel tube 11 and the king post 9 cooperate with guy wires 59 to provide a means of bracing outboard wing tube 57 and adjustment of the angle of attack of the wing tip tube 17. Lastly, the location of the transmission unit 61 is shown.

Figure 12:
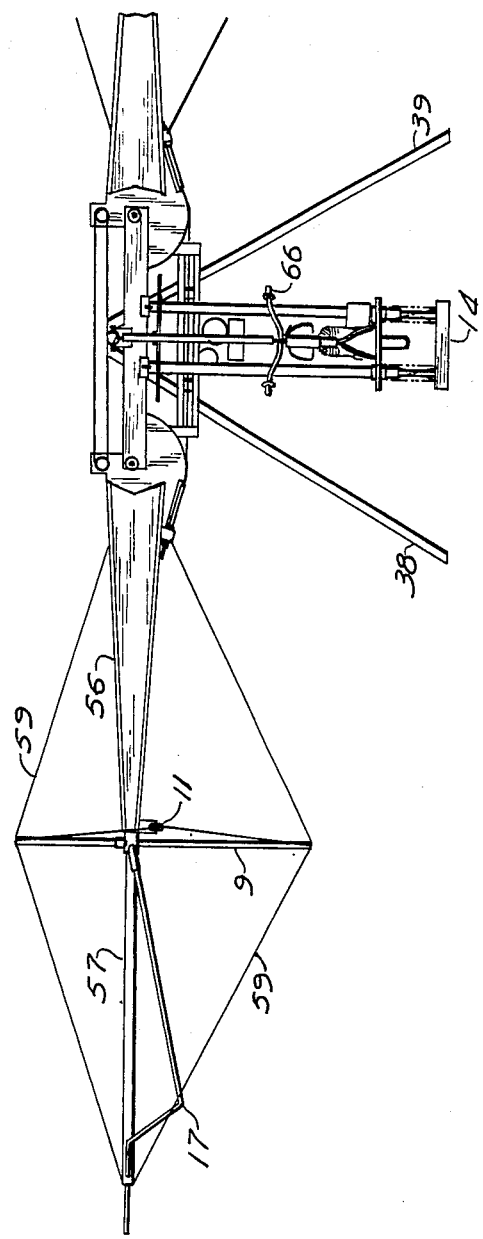
FIG. 12 is a front elevational view of FIG. 11 without the sails.

FIG. 12 again illustrates the vehicle structure from the front elevation with the sails removed. Hereagain is shown the structure of the wing, the inboard wing spar 56, the outboard wing tube 57, the wing tip tube 17, the wing keel tube 11, and the guy wires 59.

Figure 13:
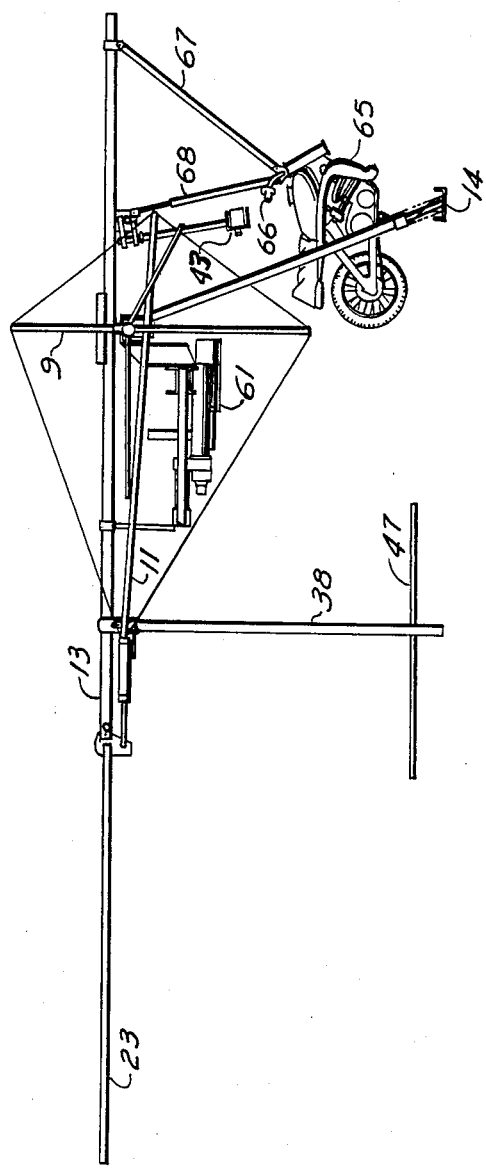
FIG. 13 is a right side elevational view of FIG. 11, also without the sails.

FIG. 13 depicts the structure of the vehicle from the right side elevation without the sails. It shows more clearly the positioning of the transmission unit 61. Also shown is the pilot support and power unit 65 which is supported by the tension rod 68 and the drag rod 67. Handlebars 66 are also shown.

Figure 14:
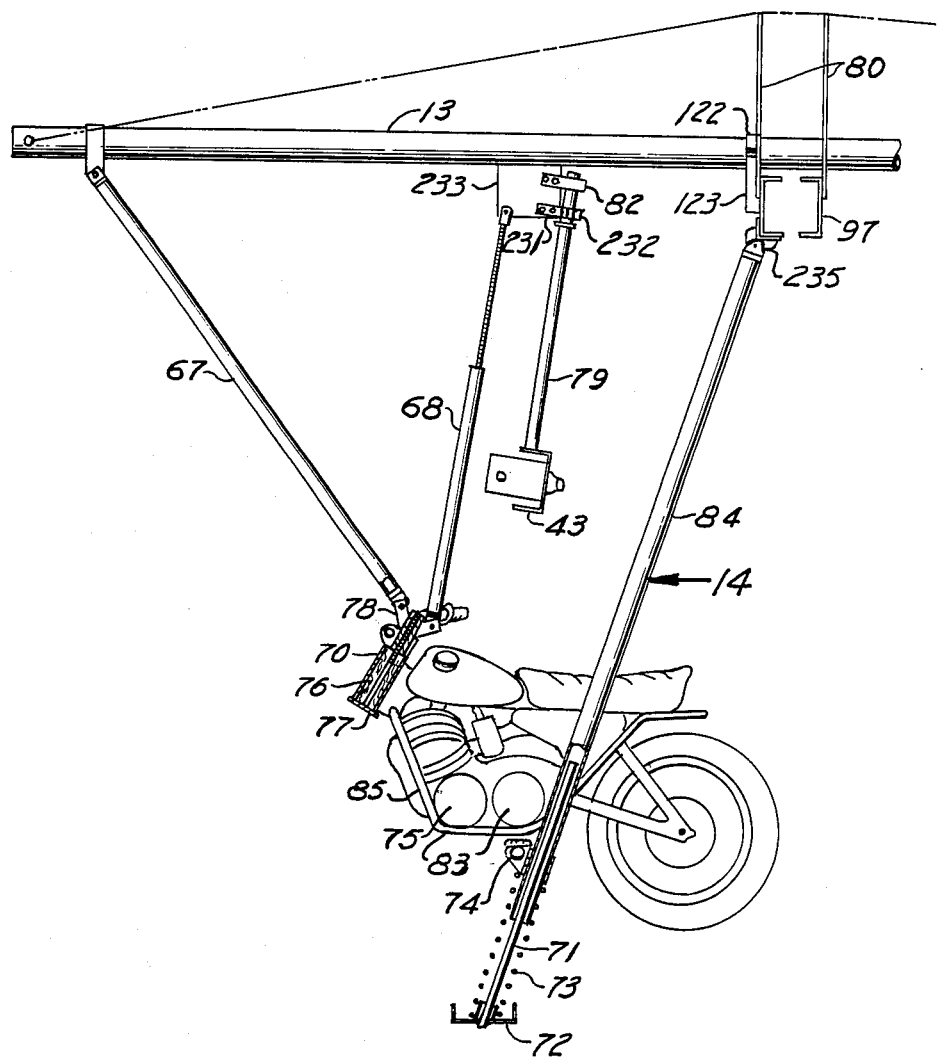
FIG. 14 is a left side elevational view of a portion of FIG. 11 showing an enlargement of the pilot area.

FIG. 14 illustrates a left side elevation view. There is depicted the makeup of the front support 14. To the foot 72 there are welded the guide tubes 71 which guide in the main support tubes 84. The shocks caused by landing are absorbed by two springs 73, rather than by the main support tubes 84. The front support tube 74 supports the motorcycle frame 85.

At the upper front portion of the motorcycle frame 85 is the gooseneck 70 which provide means of supporting the handlebar 66 as well as attachment for the tension rod 68 and the drag rod 67. The gooseneck 70 contains an inner spacer 76 which may preferably, but not necessarily, be made of wood. The motorcycle handlebar 66 is held to the gooseneck 70 by means of a special bolt 77 and wing nut 78. It is the wing nut 78 to which the tension rod 68 and the drag rod 67 are attached.

The main support tubes 84 are hinge mounted to the wing support channels 97 by means of brackets 235. To the wing support channels 97 there are attached the sail supports 80 which preferably, but not necessarily, are plywood members, the function of which is to raise the sails over the wing area to provide clearance for the various mechanisms, especially the mechanism to retract the wings which is described hereinbelow.

Figure 15:
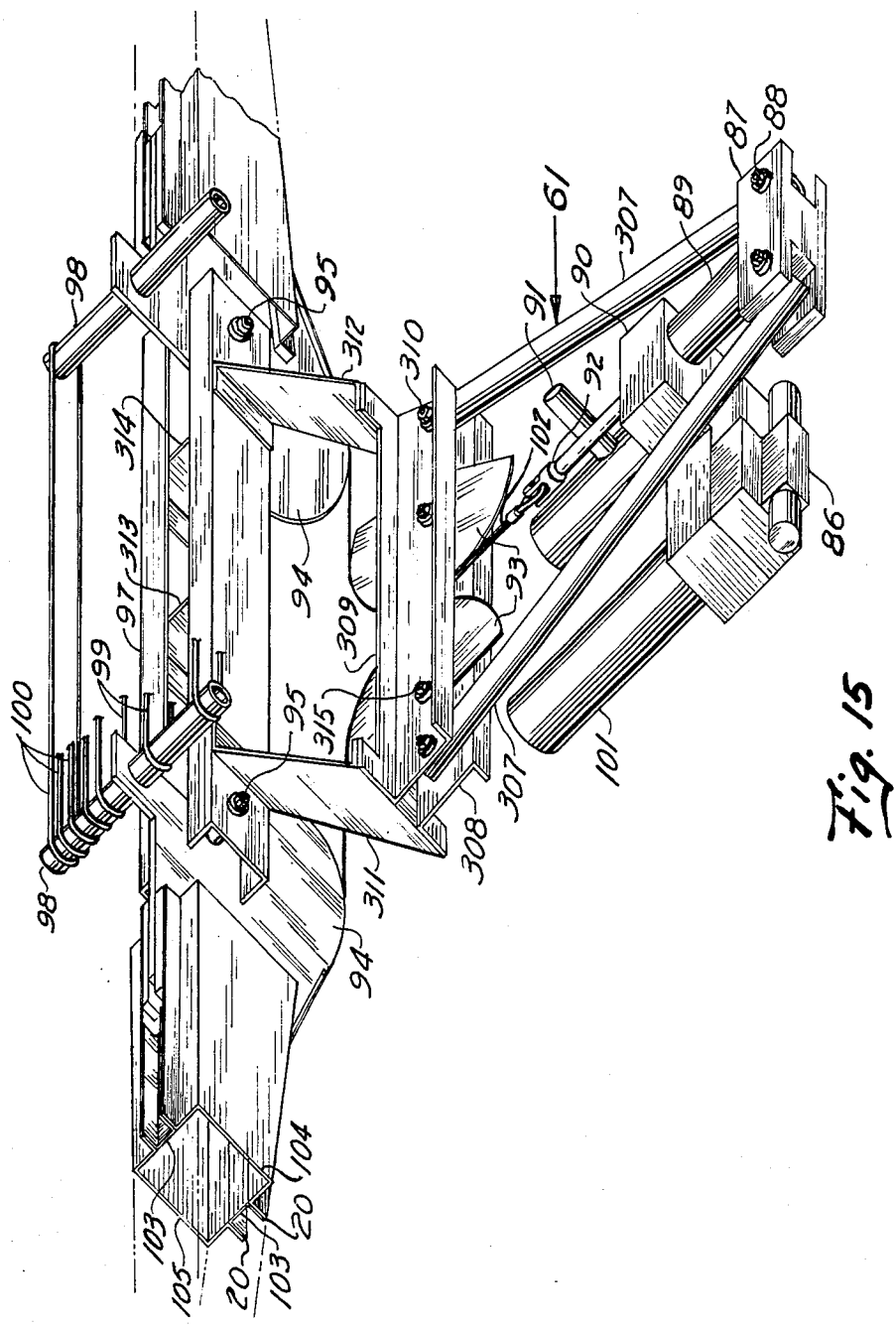
FIG. 15 is a perspective view of the hydraulic transmission and the wing controls.

FIG. 15 illustrates a perspective view of the hydraulic transmission and the wing controls. First, a more detailed explanation of the wing structure is shown and described. The inboard wing spar 56 is made up of the leading edge spar 105 having a hat section and a trailing edge spar 104 having a hat section held together by the U-channels 103 which are bonded to the spars by "LOCKTITE" superglue 20 and reinforced by huckbolts.

The frame tubes 307 provide the necessary support structure for connecting the wing power cylinder 89 to the idler pulley support channels 308 and 309 with pins 310 and pins 88. The idler pulleys 93 are supported to the idler support channels 308 and 309 by means of pivot pins 315 which construction is similar to that shown in FIG. 18. The idler support channels 308 and 309 are attached to the wing support channels 97 by means of brackets 311 and 312. The wing support channels 97 are in turn braced by members 313 and 314. The wing support channels 97 provide a means of retaining the wings and means of attachment to the main keel tube 13 which will be described in FIG. 16.

The wing power cylinder 89 which employs only the retraction stroke to power both wings synchronously, is connected to the wings by means of the main power cable 102 which is yoked to the cylinder rod end 92. Rod end 92 is cammed to actuate the limit switches 201 and 202 (FIG. 19) for the automatic stroking of cylinder 89. The main power cable 102 comprising a forked configuration is guided to each wing around its respective idler pulley 93 and then to and around its respective flexor pulley 94, the attachment to which will be described hereinbelow. The back end of the wing power cylinder 89 terminates into cylinder cap rear 87 which in turn provides a means of attaching to frame tubes 307 with pins 88. The manifold cylinder cap front 90 provides communicating oil passages to the cylinder with and also means of mounting the accumulator 101, the pilot-operated solenoid-controlled 4-way valve 86, and the reservoir with standpipe 91. The standpipe allows the gases to accumulate at the highest point of the system in order to be vented to the atmosphere.

Near the top of FIG. 15 there are shown the wing support channels 97 which hold the wings together in position. Also, above the top of the wing flexor pulleys 94 there are shown the retracting support rods 98. Around the retracting support rods 98 there are mounted a plurality of elastic springs 100 for retracting the wings to their upper position. These elastic springs 100 are preferably, but not necessarily, made of latex tubing. Along with the elastic springs 100 there are two belts of nylon rope 99 closest to the flexor pulley 94. These ropes 99 also give some flexibility, but they also function as bump stops to prevent the wings from over-traveling beyond the design limit.

FIG. 16 illustrates the left inboard wing structure and its attachment to the main body. The wing is pivotally mounted in the wing support channels 97. Channel 97 is attached to the main keel tube 13 by means of the bracket 123 and the cap 122. The bracket 123 in turn is huckbolted to the wing support channels 97. A wing indexing hole 125 is provided through the wing support channels 97 and wing flexor pulley 94, the purpose of which is to enable the positioning of the wings through the proper adjustment of cable terminal 110. Hereagain, there is shown the main power cable 102 in position with regard to the flexor pulley 94. The power cable terminates with cable terminal 110 at its end to provide adjustment by means of the terminal block 112 mounted to the wing flexor pulley 94 and terminal retainer 121.

The method of attachment of the inboard wing spar 56 to the flexor pulley 94 is also shown. Bolts 320 are used to attach the outer flanges with the spar and transmit the aerodynamic couple loads into the flexor pulley 94 while bolts 321 are used to transmit the vertical shear load into the flexor pulley 94 and also for the attachment of rigging tang 111.

FIG. 17 depicts the attachment of the outboard wing tube 57 to the inboard wing spar 56 and the method of bracing thereof to produce a lightweight truss configuration. The wrist bracket 115 provides a means of retaining the outboard wing tube 57, the king post 10, and wing tip tube 17 which fits in socket 116 and slot 323. The inboard wing spar 56 terminates in the bracket 128 which provides a socket hole 117 to accept the outboard wing tube 57 and also provides the means for retaining the wing keel tube 11.

Cable assemblies 59, consisting of a turnbuckle assembly 127 at one end and a rigging tang 111 or 119 at the other end which are attached to the cable using thimbles 322 and nico sleeves 126 swagged into position, cooperate with the king post 10 and keel tube 11 to retain the outboard wing tube 57 in socket 117 and provide means of indexing the wing tip tube 17 by the rotation of tube 57 in its socket hole 117. The rigging tangs 119 are bolted to the king post 10 and keel tube 11 by means of bushing 118. It is by this method that the angle of attack of the wing tip tube 17 can be adjusted to produce the desired propeller force and lift for flight.

Figure 18:
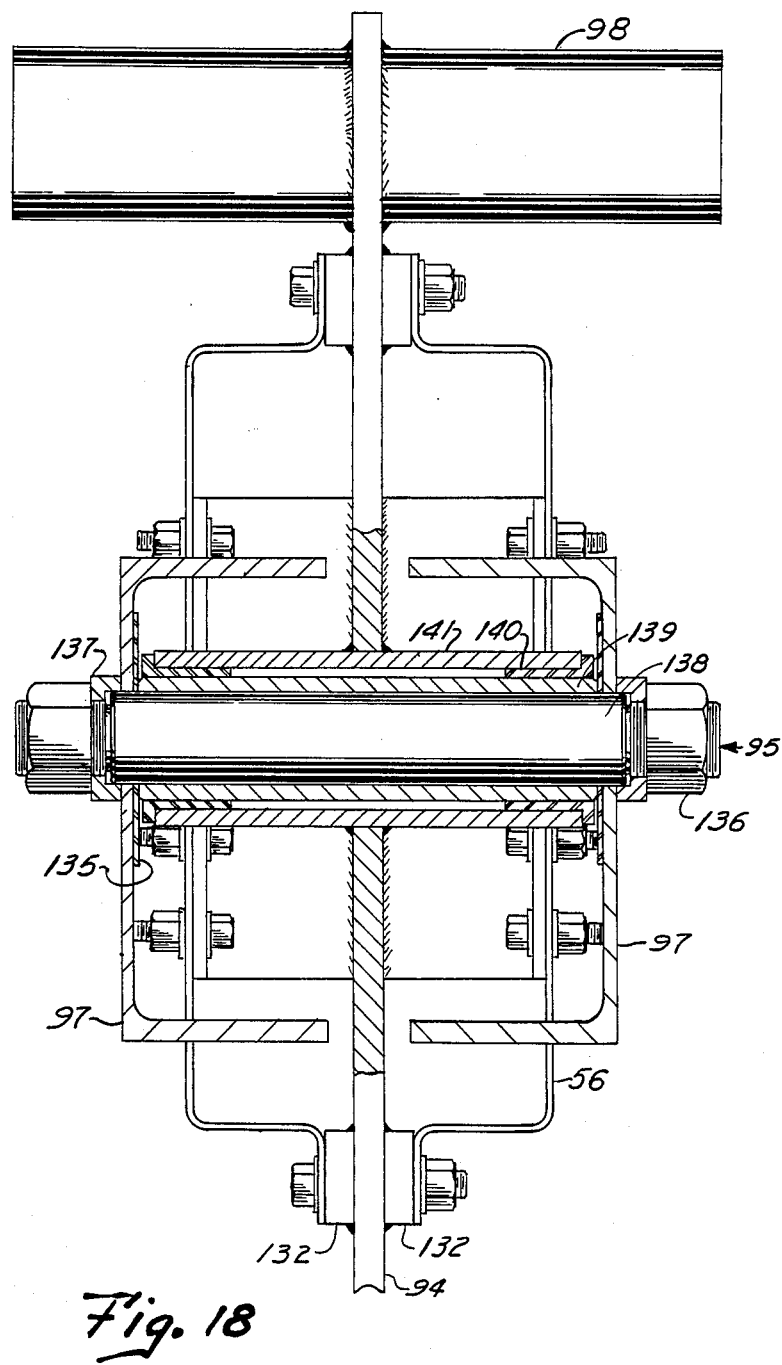
FIG. 18 is a section through the pivot pin of the wing.

FIG. 18 depicts a section through the wing pivot 95, which is also illustrated in FIGS. 15 and 16. In the center of the section there is shown the wing flexor pulley 94 which has been discussed previously hereinabove. At the top of the section there is also illustrated the retracting support rod 98 which has also been discussed previously. The spacer tangs 132 are provided to give the necessary space for attachment which is equal to or the same width as the U-channel 103 to form the box beam. Wear plates 135 are bonded to the main frame members 97 to provide a wear surface for bushings 140. The pivot pin 138 is provided with the special thrust washers 137 which ensure that only the spacer axle tube 139 is loaded by nuts 136. The spacer axle tube 139 provides the seating for the bushings 140. The bushings 140 are mounted into the pulley hub 141 which is, in turn, welded to the wing flexor pulley 94.

FIG. 19 illustrates the electrical schematic that is employed to automatically stroke the wing power cylinder 89. The two limit switches 201 and 202 provide automatic reciprocation when either the right or left pushbutton switch 203 or 204 is depressed. The cam 205 moves with the cylinder motion and actuates the limit switches 201 and 202 at either end of its travel. The limit switches 201 and 202 are double-pole units with one normally-open and one normally-closed contact. Pushing the down pushbutton switch 204 energizes the solenoid 206 and relay 207 to move the cylinder 89 with the cam 92 to the left. At the end of travel, the limit switch 202 is actuated, de-energizing the solenoid 206 and energizing the solenoid 208 and the relay 209. Each relay locks in when it is actuated so that it remains energized thereby preventing actuation of the alternate solenoid. This prevents both solenoids 206 and 208 from being energized at the same time, should a pushbutton switch be accidentally pressed. Pressing the stop switch 210 de-energizes the system.

Figure 20:
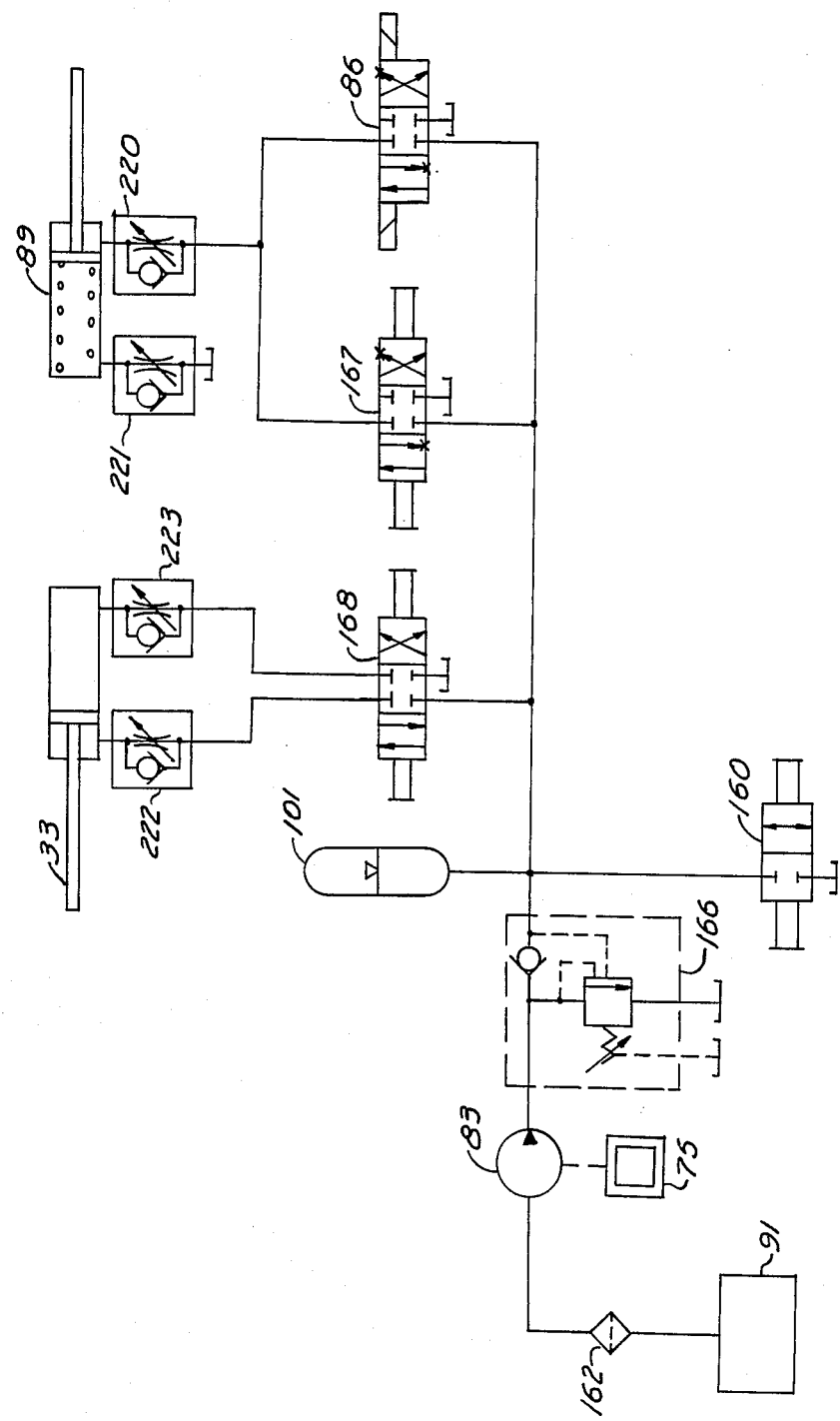
FIG. 20 is the hydraulic schematic for the operation of the ornithopter.

FIG. 20 illustrates the hydraulic schematic of the vehicle. First, there is shown the pressurized reservoir 91. The oil from the reservoir 91 goes through a filter 162 to a gear pump 83 which is driven by the motorcycle engine 75. The oil then is directed to the unloading valve 166 and the accumulator 101. The unloading valve 166 unloads the pump 83 once the desired pressure in the accumulator 101 is reached, and then allows the pump 83 to work under lower pressures without unnecessarily creating heat. When the system is turned off, it is desirable to have all the components unloaded, such as the accumulator 101. To accomplish this, a hand-actuated valve 160 is provided.

To the right side of the FIG. 20 schematic there is shown a directional control, pilot-operated, solenoid-controlled 4-way valve 86. However, the valve 86 is modified into a 3-way 3-position valve by blocking one port and converting the double-acting hydraulic cylinder 89 into a single-acting device where fluid pressure is used only during the retraction stroke of the cylinder. The cylinder 89 is returned to the extended position by the elastic springs 100 (FIG. 15). Flow control valves 220 and 221 are used to regulate the speed of the cylinder which in turn governs the wing tip velocities.

In the same circuit there is provided a means for manually controlling the positioning and/or stroking of the wings. Valve 167, which is a hand-operated 3-position 4-way valve modified similarly to the automatic valve 86 described hereinabove into a 3-way 3-position valve, is used for this purpose.

The hand-operated 3-position 4-way valve 168 is used to control the double-acting tail cylinder 33 which controls the horizontal tail surface. Again, flow control valves 222 and 223 are provided for adjustment of the speed of operation.

It is clear from the foregoing description that the various objects set forth hereinabove are efficiently attained by the present invention. Because various changes and modifications may be made therein without departing from the spirit and scope of the invention, it is intended that the foregoing description including the accompanying drawings should be interpreted as illustrative and not restrictive. The scope of the invention is indicated by the appended claims, rather than by the foregoing description.

I claim:

1. An ornithopter, comprising:
    a fuselage;
    a pair of main wings joined to said fuselage;
    a power source supported by said fuselage;
    a single-acting hydraulic cylinder powered by said power source;
    said hydraulic cylinder being operably connected to said pair of main wings to simultaneously pull both wings downwardly to propel said ornithopter;
    said fuselage being provided with a main keel tube acting as the main structural member of said ornithoper;
    a fuselage sail being joined to said fuselage by fastening to a plurality of keels, tubes and cables;
    means for said wings to pivot downwardly and back to their normal up position;
    wing sails attached to a plurality of keels, tubes and cables;
    a horizontal tail joined to said fuselage;
    a horizontal tail sail and tail structural means to keep said tail under tension;
    a front support and a left rear leg and a right rear leg securely attached and supporting said fuselage, with said front support having shock absorbing means;
    a hydraulic circuit powered by said power source including a pump, a pressurized reservoir, accumulator, said single-acting hydraulic cylinder which pulls both wings downwardly simultaneously on the retraction stroke, and a double-acting hydraulic cylinder which operates said horizontal tail in its up and down movement;
    elastic means supported by said wings for returning said wings to said normal up position after being pulled downwardly by said retraction stroke of said single-acting hydraulic cylinder;
    electronic means to provide automatic reciprocation and cause said wings to flap automatically; and
    operating controls housed in a control panel supported by said main keel tube and including a wing control handle, a horizontal tail control handle, and a rudder control bellcrank.

2. An ornithopter according to claim 1, wherein:
    said sails are made from a material which is a combination of Dacron and Mylar glued to a latex rubber sheeting where said sails are attached to various ones of said keels, tubes and said cables.

3. An ornithopter according to claim 1, wherein:
    said wing control handle is part of a 4-way valve that actuates said single-acting hydraulic cylinder for controlling said wings; and
    said horizontal tail control handle is part of a 4-way valve that actuates said double-acting hydraulic cylinder to move said horizontal tail up and down.

4. An ornithopter according to claim 1, wherein:
    said rudder control bellcrank is connected by steel cables to a left rear control bellcrank and to a right rear control bellcrank attached to said left leg and said right leg, respectively, supported by a saddle and connected to each other by an elastic member.

5. An ornithopter according to claim 1, wherein:
    said horizontal tail structural means includes a tail main tube, a left tail rod structure, and a right tail rod structure, all connected to a tail cross member which forms the tail structure to which said tail sail is fastened.

6. An ornithopter according to claim 1, wherein:
    said shock absorbing means includes a foot, two guide tubes fastened to said foot, said guide tubes moving up and down within two main support tubes, and two springs that surround said main support tubes and said guide tube for absorbing the shock of landing.

7. An ornithopter according to claim 1, 2, 3, 4, 5 or 6, wherein each of said main wings (3 or 4) includes:
- an inboard wing spar (56), an outboard wing tube (57), cable assemblies (59), a wrist bracket (115), a wing tip tube (17), a king post (9 or 10), a box beam bracket (128), and a wing keel tube (11 or 12);
- said inboard wing spar (56) including a box beam configuration (FIG. 15);
- said outboard wing tube (57) being attached to said inboard wing spar (56) to form a lightweight truss configuration (FIG. 17);
- said lightweight truss configuration (FIG. 17) of said inboard wing spar (56) and said outboard wing tube (57) being braced by said cable assemblies (59) for support and for angle of attack adjustment;
- said box beam bracket (128) supporting said wing keel tube (11 or 12); and
- said wrist bracket (115) positions said outboard wing tube (57), holds said wing tip tube (17), holds said king post (9 or 10), and cooperates with said box beam bracket (128) which supports said wing keel tube (11 or 12) to form the tube members for said lightweight truss configuration (FIG. 17).

8. An ornithopter, comprising:
- a fuselage;
- a pair of main wings joined to said fuselage;
- a power source supported by said fuselage;
- a single-acting hydraulic cylinder powered by said power source;
- said hydraulic cylinder being operably connected to said pair of main wings to simultaneously pull both wings downwardly to propel said ornithopter; and
- each of said main wings including a flexor pulley and an inboard box beam, an outboard wing tube, a king post, and a wing keel tube braced by cables into a truss configuration.

* * * * *

UNITED STATES PATENT AND TRADEMARK OFFICE
CERTIFICATE OF CORRECTION

PATENT NO. : 4,749,149

DATED : JUNE 7, 1988

INVENTOR(S) : Peter GRUICH

It is certified that error appears in the above-identified patent and that said Letters Patent is hereby corrected as shown below:

```
Column 3, line 48, after "of" insert --the--.
Column 6, line 66, change "provide" to --provides--.
Column 7, line 52, delete "with".
```

Signed and Sealed this

Sixth Day of September, 1988

Attest:

DONALD J. QUIGG

*Attesting Officer*     *Commissioner of Patents and Trademarks*